United States Patent [19]

Itoh

[11] Patent Number: 4,580,598

[45] Date of Patent: Apr. 8, 1986

[54] SERVO VALVE

[76] Inventor: Seiichi Itoh, 19-6, Shiba 2-chome, Minato-ku, Tokyo, Japan

[21] Appl. No.: 613,060

[22] Filed: May 22, 1984

[30] Foreign Application Priority Data

Jun. 2, 1983 [JP]   Japan .................................. 58-96926

[51] Int. Cl.[4] ........................................... F15B 13/044
[52] U.S. Cl. ................................ 137/596.17; 91/454; 91/459; 251/129.14; 251/129.16; 251/129.21
[58] Field of Search ................................ 91/454, 459; 137/596.17; 251/139, 129.14, 129.16, 129.21

[56]        References Cited

U.S. PATENT DOCUMENTS

| 3,225,782 | 12/1965 | Begley et al. | 251/139 X |
| 3,565,111 | 2/1971 | Pearson | 137/596.17 |
| 3,861,644 | 1/1975 | Knape | 251/139 |
| 4,281,682 | 8/1981 | Satoh | 137/596.17 |

Primary Examiner—Gerald A. Michalsky

Attorney, Agent, or Firm—Birch, Stewart, Kolasch & Birch

[57]            ABSTRACT

A servo valve comprising a source pressure valve whose inlet port receives a source pressure and whose outlet port communicates with the output of the servo valve, a pressure relief valve, which may operate independently from the source pressure valve, whose inlet port communicates with the outlet port of the source pressure valve and whose outlet port communicates with a pressure sink, for instance the atmosphere, and an electric circuit which controls both the source pressure valve and the pressure relief valve in such a manner that their actions are cooperative in a certain way. Since the source pressure valve and the pressure relief valves are not linked to each other by any mechanical means, the servo valve is very simple in its mechanical structure, fast in response, and does not require subtle mechanical adjustment.

2 Claims, 13 Drawing Figures

SERVO VALVE

BACKGROUND OF THE INVENTION

This invention relates to a valve for controlling flow rate or pressure as a function of electric and other input signals, or in other words to a servo valve.

The nozzle-flapper type valve has been common as a conventional electric-pneumatic servo valve. However, such a nozzle-flapper type pneumatic servo valve has the following shortcomings.

(1) Its mechanical structure is so complicated that it causes difficulty for compact design, and its manufacturing cost is extremely high.

(2) The response is delayed due to the nozzle flapper system and other mechanical moving parts.

Figure 1:
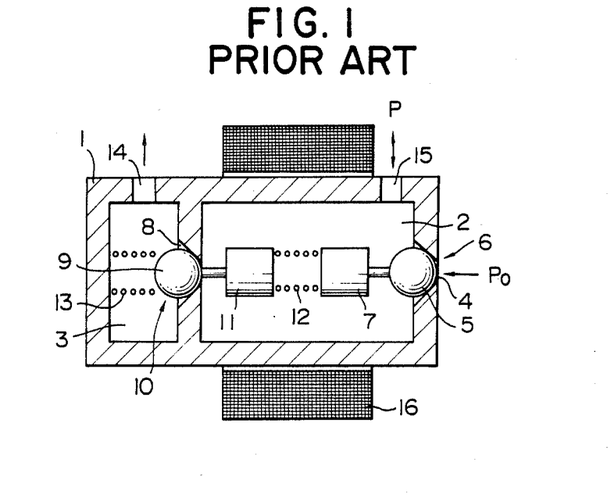
FIG. 1, which relates to the prior art, is a sectional view showing a conventional pneumatic servo valve.

Lately, in Japanese Patent Laying-Open Publication No. 58-161821, an electric-pneumatic servo valve as briefly shown in FIG. 1 has been proposed. In this drawing, the reference numeral 1 denotes a main body, 2 denotes a first chamber formed within the main body 1, and 3 denotes a second chamber which is also formed within the main body 1. 4 is a source pressure valve outlet which opens into the first chamber 2 and receives a source pressure P0 from outside, while 5 is a valve element which cooperates with the source pressure valve outlet 4, and the source pressure valve outlet 4 and the valve element 5 make up a source pressure valve 6. 7 is an armature of the source pressure valve 6, mounted on the valve element 5.

8 is a pressure relief valve outlet which communicates the first chamber 2 with the second chamber 3, while 9 is a valve element which cooperates with the pressure relief valve outlet 8, and the pressure relief valve outlet 8 and the valve element 9 make up a pressure relief valve 10. 11 is an armature of the pressure relief valve 10, mounted on the valve element 9, while 12 is a gain adjustment spring which, interposed between the two armatures 7, 11, biases the valve element 5 so as to close the source pressure valve outlet 4 and at the same time biases the valve element 9 so as to open the pressure relief valve outlet 8.

13 is a zero adjustment spring which biases the valve element 9 so as to close the pressure relief valve outlet 8, 14 is an opening which communicates the second chamber 3 with the atmosphere, 15 is an output port which opens out from the first chamber 2, and 16 is an electromagnetic coil.

Now, suppose a fixed source pressure P0 is always supplied to the source pressure valve outlet 4 from outside, then according to the equilibrium of forces acting on the valve element 5 of the source pressure valve 6 the following equation holds:

$$P_0 A + f \leq PA + k_1 x_1 \quad (1)$$

where A is the effective cross sectional area of the source pressure valve outlet 4 and the pressure relief valve outlet 8, f is the electromagnetic attracting force between the armatures 7 and 11, P is the output pressure obtained at the output port 15, $k_1$ is the spring constant of the gain adjustment spring 12, and $x_1$ is the displacement of the gain adjustment spring 12.

And according to the equilibrium of forces acting on the valve element 9 of the pressure relief valve 10, the following equation holds:

$$PA + k_1 x_1 \leq k_2 x_2 + f \quad (2)$$

where $k_2$ is the spring constant of the zero adjustment spring 13, and $x_2$ is the displacement of the zero adjustment spring 13.

The above two equations are equations of inequality instead of equations of equality because the source pressure valve 6 and the pressure relief valve 10 are one way valves. Now, the output pressure P obtained at the output pressure outlet 15 takes a value which satisfies both Eqs. (1) and (2), but by adjusting the initial displacement of the springs 12, 13 with an adjustment mechanism not shown in the drawing so that $$P_0 A = k_1 x_1 = k_2 x_2 \quad (3)$$

holds, then the solution to the set of equations of inequality consisting of Eqs. (1) and (2) is given as:

$$P = f/A \quad (4)$$

As can be seen from this equation, by controlling the electric current supplied to the coil 16 and thereby changing the magnetic attractive force F acting between the armatures 7 and 11, the output pressure P may be controlled.

This pneumatic servo valve can alleviate the shortcomings of the previously mentioned nozzle-flapper type pneumatic servo valve to a certain extent. However, even according to this pneumatic servo valve, there are such shortcomings as:

(a) The mechanical structure is still complicated, and the number of component parts is great. (FIG. 1 is intended for the explanation of the working principles of the servo valve, and is therefore extremely simpified. Although the number of parts appearing in FIG. 1 is not very large, in reality the number of parts of this servo valve cannot help but be great, because of the adjustment mechanism for adjusting the initial displacements of the springs 12 and 13, among other things).

(b) The response speed is not yet sufficient.

(c) The mechanical adjustment of the gain adjustment spring 12 and the zero adjustment spring 13 is subtle and requires some skill.

(d) For the above reason, some risk of increasing the variations in the gain of each servo valve may be caused.

(e) There may be some risk that the armatures 7 and 11 may adhere to each other whereby the servo valve may be put out of operation.

(f) When the source pressure P0 changes, the mechanical adjustment of the gain adjustment spring 12 and the zero adjustment spring 13 must be made all over again.

These shortcomings (a) to (f) are in principle caused by the fact that the source pressure valve 6 and the pressure relief valve 10 are connected together by a mechanical system, according to this prior art servo valve.

Although the above discussion has been limited to pneumatic servo valves, similar shortcomings are present also in hydraulic servo valves.

SUMMARY OF THE INVENTION

Accordingly, it is the primary object of the present invention to provide a servo valve which is even more simple in mechanical structure, adapted for compact design, and economical for manufacture.

It is a further object of the present invention to provide such a servo valve which is fast in response.

It is a further object of the present invention to provide such a servo valve which is free from the need for mechanical adjustment of springs or the like.

It is a further object of the present invention to provide such a servo valve which can provide uniform properties even when mass-produced.

It is a further object of the present invention to provide such a servo valve which which does not require to be adjusted even when the source pressure has changed.

According to the present invention, these and other objects are accomplished by a servo valve, comprising a source pressure valve whose inlet end receives a source pressure, a pressure relief valve which operates independently from said source pressure valve in mechanical sense and whose outlet end is kept at a pressure which is lower than said source pressure, an output port which is connected both to an outlet end of said source pressure valve and to an inlet end of said pressure relief valve, and an electric circuit which, when an input signal has changed to the effect that an output pressure on said output port should be raised, activates said source pressure valve so as to reduce a pressure difference between said inlet and said outlet ends of said source pressure valve, and activates said pressure relief valve so as to increase a pressure difference between said inlet and said outlet ends of said pressure relief valve, and, when said input signal has changed to the effect that said output pressure on said output port should be lowered, activates said source pressure valve so as to increase said pressure difference between said inlet and said outlet ends of said source pressure valve, and activates said pressure relief valve so as to reduce said pressure difference between said inlet and said outlet ends of said pressure relief valve, or a servo valve, comprising a casing having a partition wall defining a first and a second chambers therein, an inlet port having an input port at its external end and a first valve seat at its internal end opening into said first chamber, a first valve element which cooperates with said first valve seat, a first drive means for activating said first valve element, a communication passage, defined in said partition wall therethrough, which communicates with said first chamber at its one end in said first chamber and defines a second valve seat at its other end in said second chamber, a second valve element cooperating with said second valve seat, a second drive means for activating said second valve element, an output port communicating with said first chamber, said first and said second valves being formed as one-way valves which, when their valve elements are not activated, allow fluid flow from said input port into said first chamber and then into said second chamber.

Thus, according to the servo valve of this invention, particularly since the valve elements of the source pressure valve and the pressure relief valve, or the first and the second valve elements, may be activated independently and there is no mechanical part interconnected between the two valve elements, the response of the servo valve may be made extremely fast, and, since the mechanical structure is extremely simplified and the number of component parts becomes extremely small, no subtle mechanical adjustment is required, as opposed to the conventional devices, and, further, even when the source pressure has changed there is no need to repeat the mechanical adjustment all over again.

The above-mentioned advantages is particularly significant when such a valve is mass-produced, because any variations in properties from one servo valve to another may be easily adjusted corrected and it becomes possible to provide a large number of servo valves with uniform gains and other properties.

Further, according to a more particular aspect of the present invention, these and other objects are more particularly and concretely accomplished by forming each of the valve seats as a bevelled opening and each of the valve elements as a globular member, and providing each of the electromagnetic means or the drive means as consisting of a stator core surrounding the valve seat, a coil disposed substantially inside the stator core, and a discular armature opposing to the corresponding stator core with a magnetic gap therebetween for driving the corresponding valve element.

According to such a structure, an extremely fast response may be achieved because the movable parts, i.e. the armature and the valve element, may have small masses whereas the coil may be able to exert a strong electromagnetic force to the armature through the advantageous configuration of the stator core and the armature.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENT

Now, this invention will be described in more detail in terms of the preferred embodiment thereof shown in the drawing. This invention is also applicable to hydraulic servo valves, but the following embodiment is an example of an application of this invention to a pneumatic servo valve.

Figure 2:
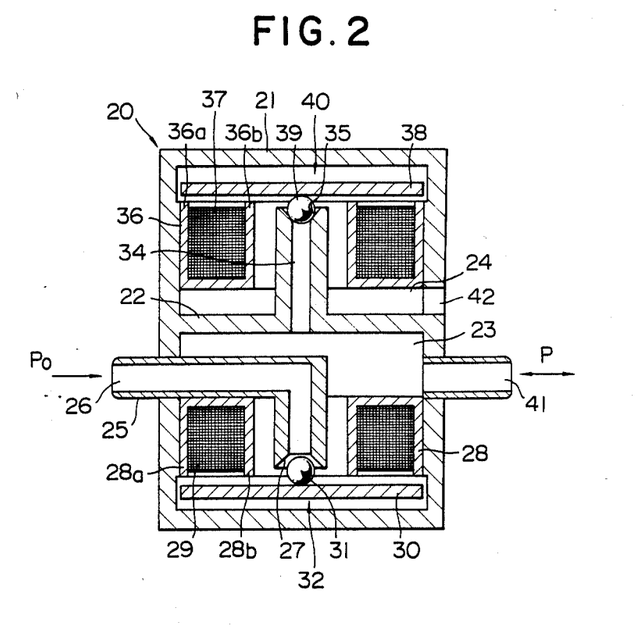
FIG. 2 is a sectional view showing the mechanical structure of the preferred embodiment of the servo valve according to this invention.

FIG. 2 is a sectional view showing a mechanical structural portion of a servo valve 20 according to a preferred embodiment of this invention. Within a casing 21 are defined a first chamber 23 and a second chamber 24 which are mutually separated from each other by a partition wall 22. 25 is a tubular source pressure passage member and an end of this source pressure passage member 25 projects outside of the casing 21, while the other end projects into the first chamber 23. And the interior of the source pressure passage member 25 defines a source pressure passage 26, which is connected to a source pressure supply source (not shown in the drawing) which supplies a source pressure P0. Further, a valve seat 27 consisting of a bevelled opening is formed at the first chamber 23 end of the source pressure passage 26.

In the first chamber 23 is fixedly secured a substantially double tubular stator core 28 consisting of magnetic material, and an electromagentic coil 29 is accommodated between an outer tubular portion 28a and an inner tubular portion 28b of this stator core 28. A disk shaped armature 30 is loosely interposed between the stator core 28 and the casing 21 so as to complete a magnetic circuit in cooperation with the stator core 28, and a globular valve element 31 is accommodated between this armature 30 and the valve seat 27. Here, according to this embodiment, the source pressure valve 32 thus comprises the source pressure passage 26, the valve seat 27, the stator core 28, the coil 29, the armature 30, and the valve element 31.

The first chamber 23 and the second chamber 24 are mutually communicated by way of a pressure relief passage 34 provided in a tubular portion integrally formed with the partition wall 24, and a valve seat 35 consisting of a bevelled opening is formed at the tip of this pressure relief passage 34. In the second chamber 24 is fixedly secured a substantially double tubular stator core 36 consisting of magnetic material, and a coil 37 is accommodated between an outer tubular portion 36a and an inner tubular portion 36b of this stator core 36. A disk shaped armature 38 is loosely interposed between the stator core 36 and the casing 21 so as to complete a magnetic circuit in cooperation with the stator core 36, and a globular valve element 39 is accommodated between this magnetic pole body and the valve seat 35. Thus, according to this embodiment, the pressure relief valve 40 comprises the pressure relief passage 34, the valve seat 35, the stator core 36, the coil 37, the armature 38, and the valve element 39.

And the casing 21 is provided with an output port 41 which communicates with the first chamber 23, and with an opening 42 which communicates the second chamber 24 with the atmosphere.

Figure 3:
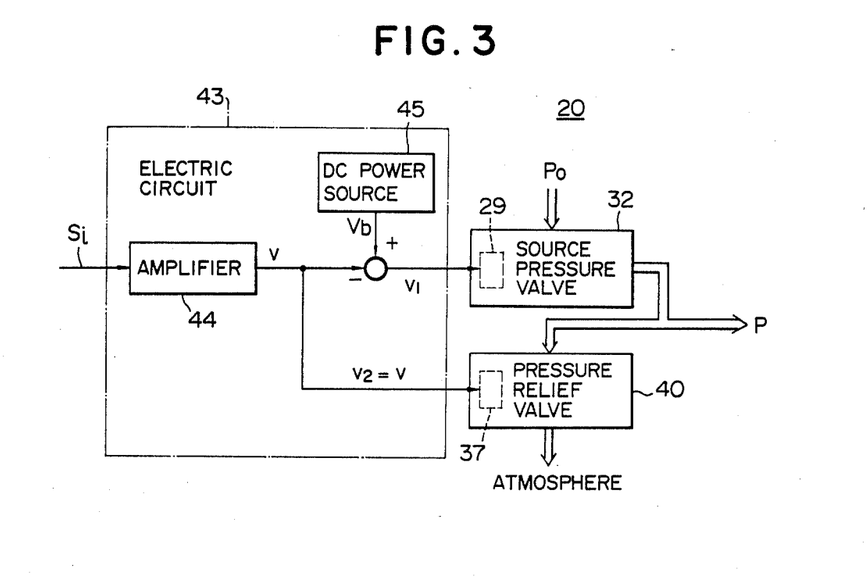
FIG. 3 is is a block diagram illustrating the basic structure of the preferred embodiment.

FIG. 3 is a block diagram showing the servo valve 20 inclusive of its control circuit. 43 is an electric circuit which has an amplifier 44 for amplifying an input electric signal Si and a DC power source 45 for outputting a fixed bias voltage Vb. And an output voltage v of the amplifier 44 is directly supplied to the coil 37 of the pressure relief valve 40 for driving it, while a voltage (Vb−v) obtained by subtracting the output voltage v of the amplifier 44 from the bias voltage Vb is supplied to the coil 29 of the source pressure valve 32 for driving it.

Now, the action of this servo valve will be briefly described in the following; the portion of the description in brackets represents that relating to the pressure relief valve 40, which is mutuatis mutandis the same as that for the source pressure valve 32.

In the source pressure valve 32 (pressure relief valve 40), when electric current is supplied to the coil 29 (37), then an electromagnetic attracting force is generated between the stator core 28 and the armature 30 (between the stator core 36 and armature 38). As a result, the armature 30 (38) pushes the valve element 31 (39) towards the valve seat 27 (35) and tends to close the source pressure valve 32 (pressure relief valve 40). And when no electric current is supplied to the coil 29 (37), then no electromagnetic attracting force is generated, and the source pressure valve 32 (pressure relief valve 40) will open.

Now, in the source pressure valve 32, suppose the electromagnetic attracting force acting between the stator core 28 and the armature 30 is f1, and the effective cross sectional area of the valve seat 27 is A, then according to the equilibrium of the forces acting on the valve element 31 of the source pressure valve 32 the following equation holds:

$$P0A \leq f1 + PA \qquad (5)$$

where P is the output pressure obtained at the output port 41 and $P0 \geq P \geq 0$.

Here, it should be noted that it is only during the process of raising the output pressure P that Eq. (5) holds all the time. This is because the source pressure valve 32 cannot release air therefrom by itself and cannot reduce the output pressure P.

Meanwhile, in the pressure relief valve 40, suppose the electromagnetic attracting force acting between the stator core 36 and the armature 38 is f2 and the effective cross sectional area of the valve seat 35 is A (which is identical to that of the valve seat 27), then according to the equilibrium of the forces acting on the valve element 39 of the pressure relief valve the following equation holds:

$$PA \leq f2 \qquad (6)$$

It should be noted here that it is only during the process of lowering the output pressure P when Eq. (6) holds all the time. This is because the pressure relief valve 40 can only release air therefrom and cannot raise the output pressure P.

Now, in this servo valve 20, when the level of input signal Si rises, the output voltage v of the amplifier 44 also rises, whereby the voltage (Vb−v) applied to the coil 29 of the source pressure valve 32 drops down while the voltage v applied to the coil 37 of the pressure relief valve 40 rises, with the result that the electromagnetic force f1 diminishes while f2 increases. Therefore, the output pressure P rises to a certain value which is determined by Eq. (5).

Conversely, when the level of the input signal Si drops, the output voltage of the amplifier 44 also drops, whereby the voltage (Vb−v) applied to the coil 29 of the source pressure valve 32 rises while the voltage v applied to the coil 37 of the pressure relief valve 40 drops, with the result that the electromagnetic force f1 increases while f2 diminishes. Therefore, the output pressure P drops to a certain value which is determined by Eq. (6).

Figure 4:
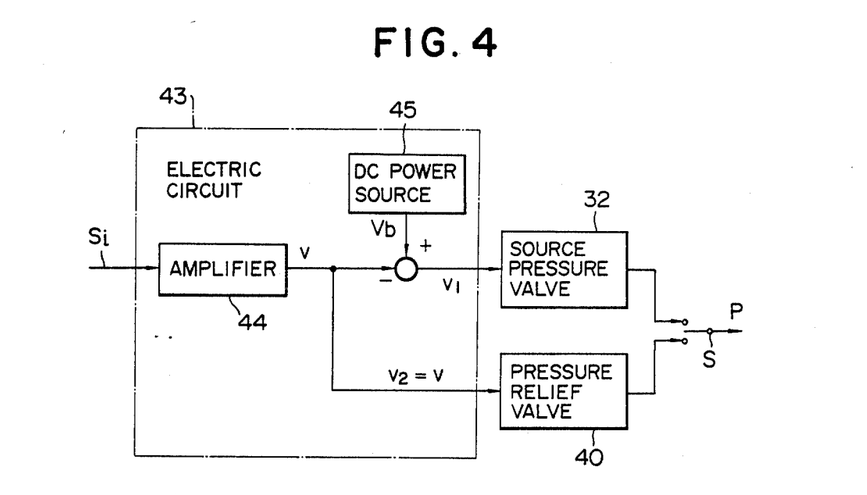
FIG. 4 is a block diagram similar to FIG. 3 showing the embodiment of FIG. 3 of its more functional aspect.

Thus since in this servo valve 20 the value of the output pressure P is determined substantially only by the source pressure valve 32 when the output pressure P rises and the value of the output pressure P is likewise determined substantially only by the pressure relief valve 40 when the output pressure P decreases, this servo valve 20 may be expressed by the block diagram given in FIG. 4 in equivalent sense. Here S is a switch which automatically switches to the side of the source pressure valve 32 when the output pressure P rises and to the side of the pressure relief valve 40 when the output pressure P drops down.

Thus, in this servo valve 20, the input signal Si and the output pressure P have a certain relationship determined by Eqs. (5) and (6). Or, in other words, the output pressure P on the output port 41 may be controlled with the input signal Si.

Furthermore, since in this servo valve 20 the pressure source valve 32 and the pressure relief valve 40 are not mechanically connected (or they operate mechanically independently from each other) and are controlled with regard to their actions by the electric circuit:

(a) the structure becomes extremely simple in the mechanical sense and the number of component parts may be drastically reduced;

(b) the response is extremely fast;

(c) no subtle mechanical adjustment is required as opposed to the previously mentioned conventional device;

(d) for the reason (c), there is no risk of increasing the variations of the gain of the servo valve; and (e) even when the source pressure P0 changes, there is no need to repeat the mechanical adjustment all over again (as will be described in detail hereinafter, by performing a feedback control and applying appropriate compensation, even when the source pressure P0 changes to a certain extent, its influence or effect may be removed).

In the naked properties of this servo valve 20, there is some hysteresis between the time when the output pressure P is rising and the time when the output pressure P is dropping. This is caused by the hysteresis properties of the stator cores 28 and 36, and the armatures 30 and 38, but such a hysteresis may be removed of its effect by performing a feedback control as will be described later.

Figure 5:
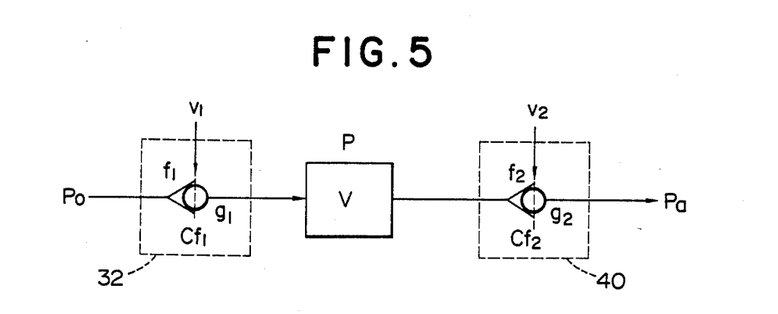
FIG. 5 is an illustrative view for a gas dynamic analysis of the preferred embodiment.

Now, a gas dynamic analysis of this servo valve 20 will be made with reference to FIG. 5.

Various variables and constants are defined as follows:

P0—source pressure in kg/cm$^2$
P—output pressure in kg/cm$^2$
Pa—exhaust pressure of the pressure relief valve 40 in kg/cm$^2$
V—volume of the space defined between the source pressure valve 32 and the pressure relief valve 40 in cm$^3$
g1—flow rate in the source pressure valve 32 in kg/sec
v1—voltage supplied to the coil 29 of the source pressure valve 32 in volts
f1—electromagnetic force acting between the stator core and the armature of the source pressure valve 32 in kg
Cf1—coefficient of resistance of the source pressure valve in seconds
g2—flow rate in the pressure relief valve 40 in kg/sec
v2—the voltage supplied to the coil 37 of the source pressure valve 40 in volts
f2—electromagnetic force acting between the stator core and the armature of the pressure relief valve 40 in kg
Cf2—coefficient of resistance of the pressure relief valve 40 in seconds The following relations hold between these variables and constants:

$$f1 = K1v1 \tag{7}$$

$$f2 = K2v2 \tag{8}$$

$$dP/dt = K(g1 - g2)/V \tag{9}$$

where K1, K2, and K are constants of proportionality.

Now, with regards to the source pressure valve 32 and the pressure relief valve 40, the following relations hold in the steady state.

With respect to the source pressure valve 32:

$$P0A = f1 + PA \tag{10}$$

With respect to the pressure relief valve 40:

$$PA = f2 + PaA \tag{11}$$

Now, it can be understood that it is when Eqs. (10) and (11) do not hold when any flow rate develops. Therefore g1 and g2 may be expressed as follows:

$$g1 = (P0A - f1 - PA)/Cf1 \tag{12}$$

$$g2 = (PA - f2 - PaA)/Cf2 \tag{13}$$

Here, since the source pressure valve 32 and the pressure relief valve 40 are assumed to have identical properties, or Cf1 = Cf2, so call them both Cf. And since the exhaust pressure Pa is released to the atmosphere, setting Pa equal to zero and substituting the above mentioned relations into Eq. (9), the following equation is obtained:

$$\begin{aligned} dP/dt &= (K/CfV)(P0A - f1 - PA - PA + f2) \\ &= (K/CfV)(P0A - 2PA - k1v1 + k2v2) \end{aligned} \tag{14}$$

In the above equation, since the source pressure valve 32 and the pressure relief valve 40 are assumed to have identical properties, K1 is equal to K2, so call them both K'. Therefore, by separating the variables as follows:

$$(dP/dt) + (K/CfV)2PA = (KK'/CfV)v2 - (KK'/CfV)v1 + (K/CfV)P0A \tag{15}$$

and performing Laplace transformation on both sides of this equation, the following equation is obtained:

$$2AP((CfV/2KA)s + 1) = K'(v1 - v2) + P0A \tag{16}$$

Figure 6:
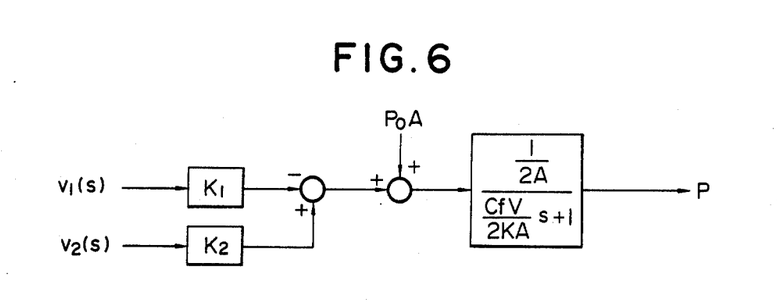
FIG. 6 is a block diagram showing the same embodiment in mathematical expression.

Eq (16) may be expressed in a block diagram as shown in FIG. 6, where K' is expressed by separating it into K1 and K2.

Figure 7:
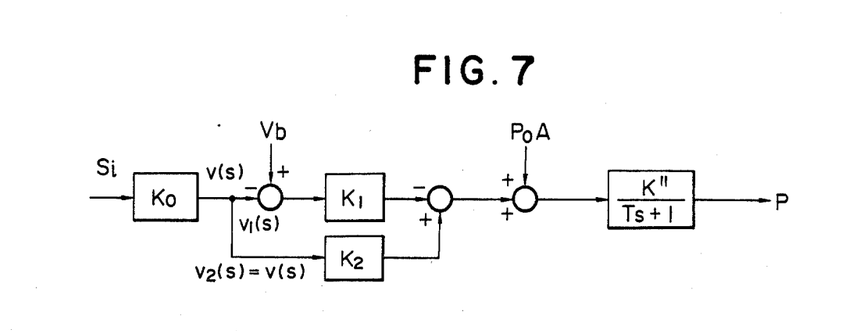
FIG. 7 is another block diagram showing the same embodiment in a more specific configuration.

In order to make the output pressure P equal to zero when the voltage of the input signal is zero, it is necessary that a bias voltage is supplied to the source pressure valve 32 to the end of cancelling the force P0A. Therefore, the block diagram for the servo valve system of FIG. 3 may be expressed as shown in FIG. 7, where T and K'' are given as follows:

$$T = C_f V / 2KA \quad (17)$$

$$K'' = \tfrac{1}{2} A \quad (18)$$

In the above embodiment, the outlet end of the pressure relief valve 40 was connected to the atmosphere, but by connecting this outlet end of the pressure relief valve 40 to a vacuum pump it becomes possible to control the output pressure P from positive pressure to negative pressure.

Figure 8:
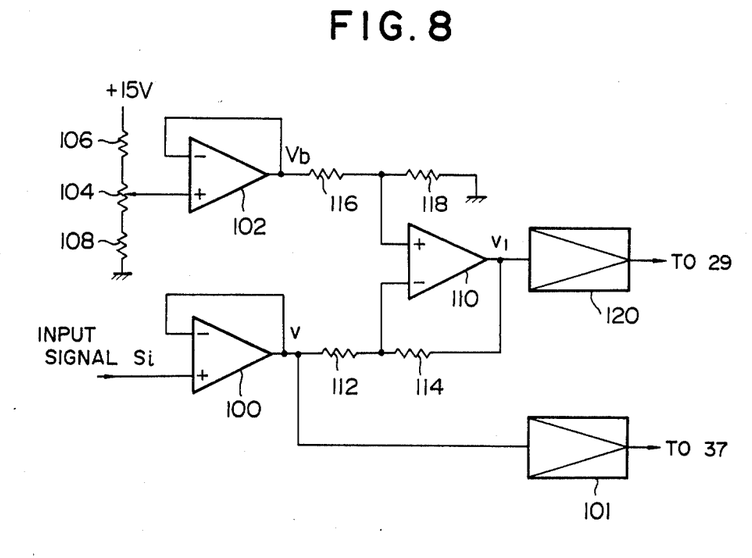
FIG. 8 is a circuit diagram showing a concrete example of the structure of the electric circuit 43 of FIG. 3.

In FIG. 8, an example of a concrete arrangement of the electric circuit 43 shown in FIG. 3 is shown for the aid of the following description. In this drawing, 100 is an operational amplifier for amplifying an input signal Si, and its inverting input is directly connected to its output for negative feedback, while its non-inverting input receives the input signal Si. The output signal v of the operational amplifier 100 is power-amplified by a differential power amplifier 101, and then supplied to the coil 37 of the pressure relief valve 40 for driving it.

102 is an operational amplifier for obtaining a bias voltage Vb and its inverting input is directly connected to its output for negative feedback, while its non-inverting input is connected to a slider tap of a potentiometer 104. One of the terminals of the potentiometer 104 is connected to a +15 V line by way of a resistor 106, while the other of the terminals is grounded via a resistor 108. The value of the bias voltage Vb obtained on the output of the operational amplifier 102 may be adjusted by moving the slider tap of the potentiometer 104.

110 is an operational amplifier which makes up a subtraction circuit along with resistors 112, 114, 116, and 118. The inverting input of the operational amplifier 110 is connected to its output by way of the resistor 114 for negative feedback, and is also connected to the output of the operational amplifier 100 by way of the resistor 112. The non-inverting input of the operational amplifier 100 is connected to the output of the operational amplifier 102 by way of the resistor 116 and is grounded via the resistor 118. On the output of the operational amplifier 110 is obtained a difference signal $v1 = Vb - v$ between the bias voltage Vb and the output signal v of the operational amplifier 100. This difference signal v1 is power-amplified by a differential power amplifier 120 and then supplied to the coil 29 of the pressure source valve 32 for driving it.

Now, an automatic control system which includes the servo valve of this invention is described in the following.

Figure 9:
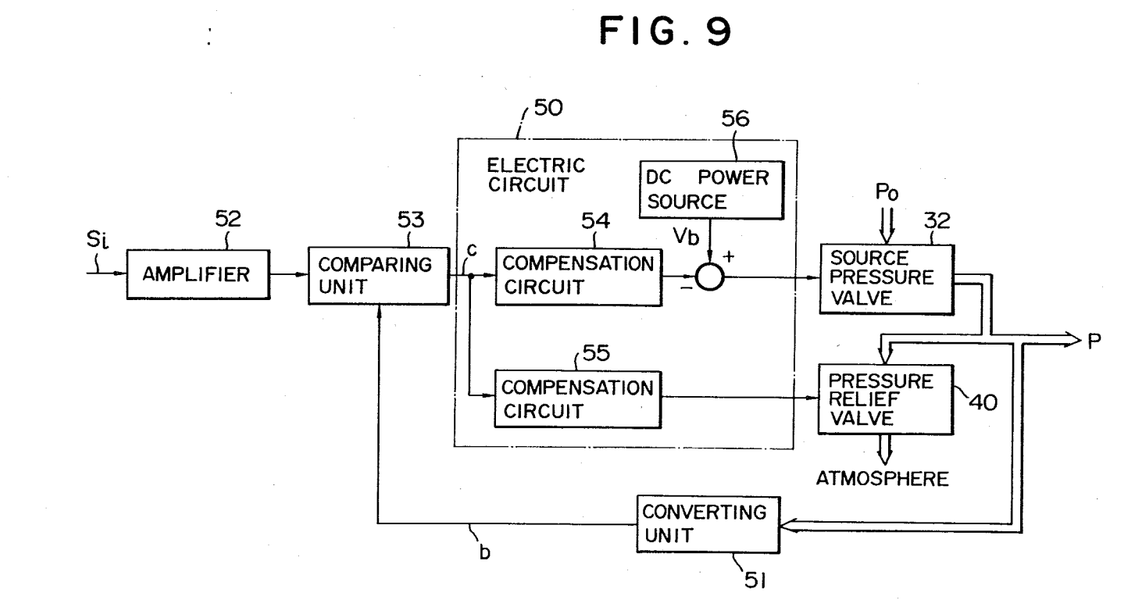
FIG. 9 is a block diagram showing an embodiment of an automatic control system which incorporates the servo valve according to this invention.

FIG. 9 is a block diagram illustrating an embodiment of the automatic control system which includes an embodiment of the servo valve of this invention. In FIG. 9, the servo valve comprises an electric circuit 50 which will be described in detail later, and a source pressure valve 32 and a pressure relief valve 40 both of which are identical in structure to those shown in FIG. 2. 51 is a converting unit which detects the output pressure P and converts it into a main feedback signal b which is an electric signal. 53 is a comparing unit which compares an input signal Si which represents a reference value and the main feedback signal b and produces a control deviation signal c which represents their difference or control deviation.

The electric circuit 50 has compensation circuits 54 and 55 and a DC power source 56. The compensation circuits 54 and 55 perform a compensation action which will be described in the following, and both receive the control deviation signal c. And a voltage obtained by subtracting the output voltage of the compensation circuit 54 from the bias voltage Vb supplied from the DC power source 56 is supplied to the source pressure valve 32 for driving it, while the output voltage of the compensation circuit 55 is directly supplied to the pressure relief valve 40 for driving it.

Figure 10:
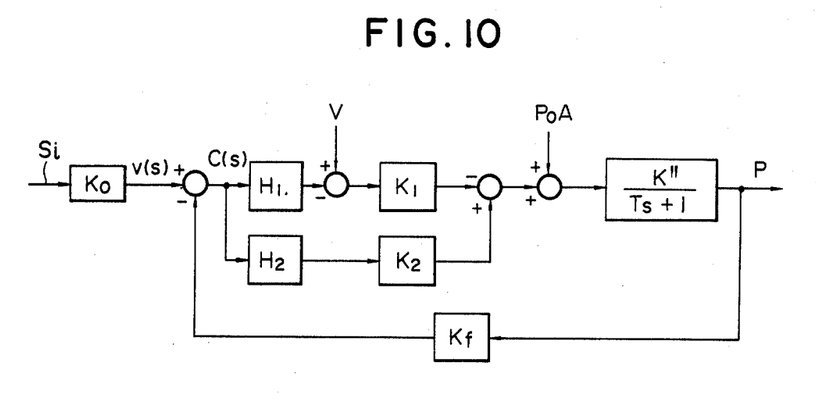
FIG. 10 is a block diagram showing said automatic control system in a mathematical expression.

FIG. 10 is a block diagram of the servo valve system of FIG. 9 in mathematical expression.

Now, in the case when the compensation circuits 54 and 55 in FIG. 9 are simply proportional compensation elements or in other words in FIG. 10;

$$H1 = Kp1 \text{ (constant)}$$

$$H2 = Kp2 \text{ (constant)}$$

And when mere gain compensation is to be performed, making the proportionality gains Kp1 and Kp2 smaller than certain levels makes it difficult to reduce a control error to a small value and makes the system more susceptible to the changes in the source pressure P0. But by making the proportionality gains Kp1 and Kp2 sufficiently great it becomes possible to improve the control precision to a level which is sufficient for most practical applications, and even when the changes in the source pressure P0 are great, its influence may be removed and the system may be stabilized.

In the case when the compensation circuits 54 and 55 are integration compensation elements or in other words in FIG. 10:

$$H1 = 1/T1s$$

$$H2 = 1/T2s$$

and an integration compensation is to be performed, it becomes possible to reduce the steady state deviation to zero and to improve the control accuracy or precision. And even when there is some change in the source pressure P0, it becomes possible to eliminate its effect, but oscillation tends to develop.

In the case when the compensation circuits 54 and 55 are phase delay compensation elements, or in other words in FIG. 10:

$$H1 = 1/(1 + T1s)$$

$$H2 = 1/(1 + T2s)$$

and a phase compensation is to be performed, the control precision may be somewhat improved, and even when there is some change in the source pressure P0, its effect may be eliminated, and the system may be stabilized.

In the case when the compensation circuits 54 and 55 are differentiation-integration compensation elements or in other words in FIG. 10:

$$H1 = (1 + A1s)/T1s$$

$$H2 = (1 + A2s)/T2s$$

and a differentiation—integration compensation is to be performed, the control precision may be raised to an extremely high level, and even when there is some change in the source pressure P0, its effect may be removed and the system may be stabilized, and furthermore the responsiveness may be improved even further.

Although in the above embodiment the pressure was fed back, it is also possible as a matter of course to feed back the displacement of the actuator which is actuated by this servo valve or other variables.

Figure 11:
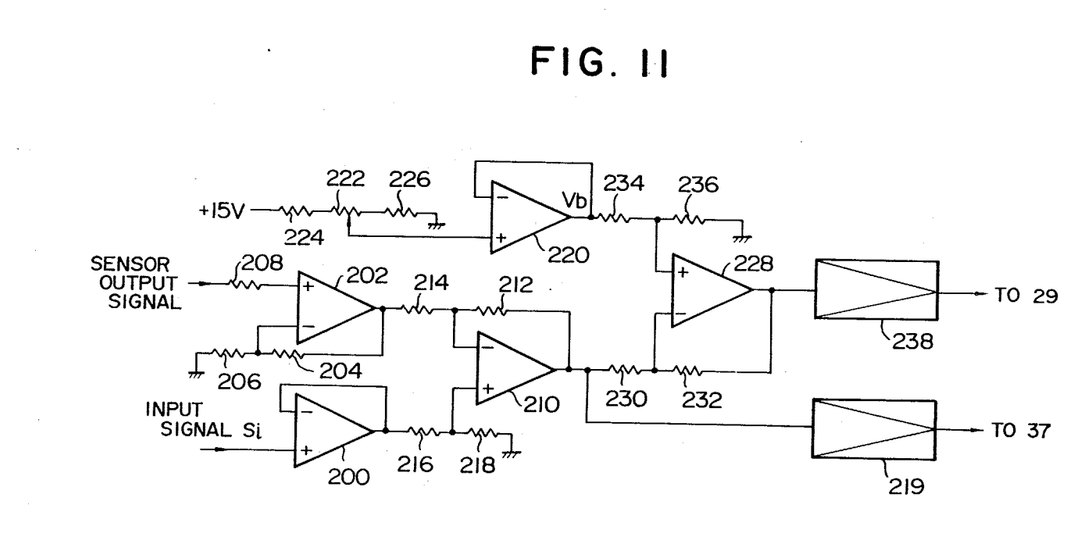
FIG. 11 is a circuit diagram showing a concrete example of the structures of the electric circuit 50, the amplifier 52, the comparison unit 53 and the converting unit of FIG. 9.

FIG. 11 shows an example of a concrete arrangement of the electric circuit 50, the amplifier 52, the comparison unit 53, and the converting unit 51 of FIG. 9. This example applies to the above described simple gain compensation.

In FIG. 11, 200 is an operational amplifier which makes up an amplifier 52 (FIG. 9), and its non-inverting input receives an input signal Si which determines the reference value while its inverting input is directly connected to its output for negative feedback. 202 is an operational amplifier which makes up the converting unit 51 (FIG. 9) along with a pressure sensor (not shown) which detects the output pressure P. The inverting input of the operational amplifier 202 is connected to its output by way of a resistor 204 for negative feedback and is additionally grounded by way of a resistor 206. The output signal of the pressure sensor is applied to the non-inverting input of the operational amplifier 202 by way of a resistor 208.

210 is an operational amplifier which makes up a subtraction circuit which functions as the comparison unit 53. The inverting input of this operational amplifier 210 is connected to its output by way of a resistor 212 and also to the output of the operational amplifier 202 by way of a resistor 214. The non-inverting input of the operational amplifier 210 is connected to the output of the operational amplifier 200 by way of a resistor 216, and is additionally grounded by way of a resistor 218. From the operational amplifier 210 is outputted a difference signal between the output signals of the operational amplifiers 200 and 202, respectively, or in other words a control deviation signal. This control deviation signal, after being power-amplified by the differential power amplifier 219, is supplied to the coil 37 of the pressure relief valve 40 for driving it.

220 is an operational amplifier for obtaining the bias voltage Vb, and its inverting input is directly connected to its output for negative feedback, while its non-inverting input is connected to a slider tap of a potentiometer 222. One of the terminals of the potentiometer 222 is connected to a +15 V line by way of a resistor 224, and the other of the terminals is grounded by way of a resistor 226. The value of the bias voltage Vb obtained on the output of the operational amplifier 220 may be adjusted by moving the slider tap of the potentiometer 222.

228 is an operational amplifier which makes up a subtraction circuit along with resistors 230, 232, 234, and 236. The inverting input of the operational amplifier 228 is connected to its output by way of the resistor 232 for negative feedback, and is also connected to the output of the operational amplifier 210 by way of the resistor 230. The non-inverting input of the operational amplifier 228 is connected to the output of the operational amplifier 220 by way of the resistor 234 and is also grounded by way of the resistor 236. On the output of the operational amplifier 228 is obtained a difference signal between the bias voltage Vb and the output signal of the operational amplifier 210. This difference signal is power-amplified by a differential power amplifier 238 and is supplied to the coil 29 of the pressure source valve 32.

Figure 12:
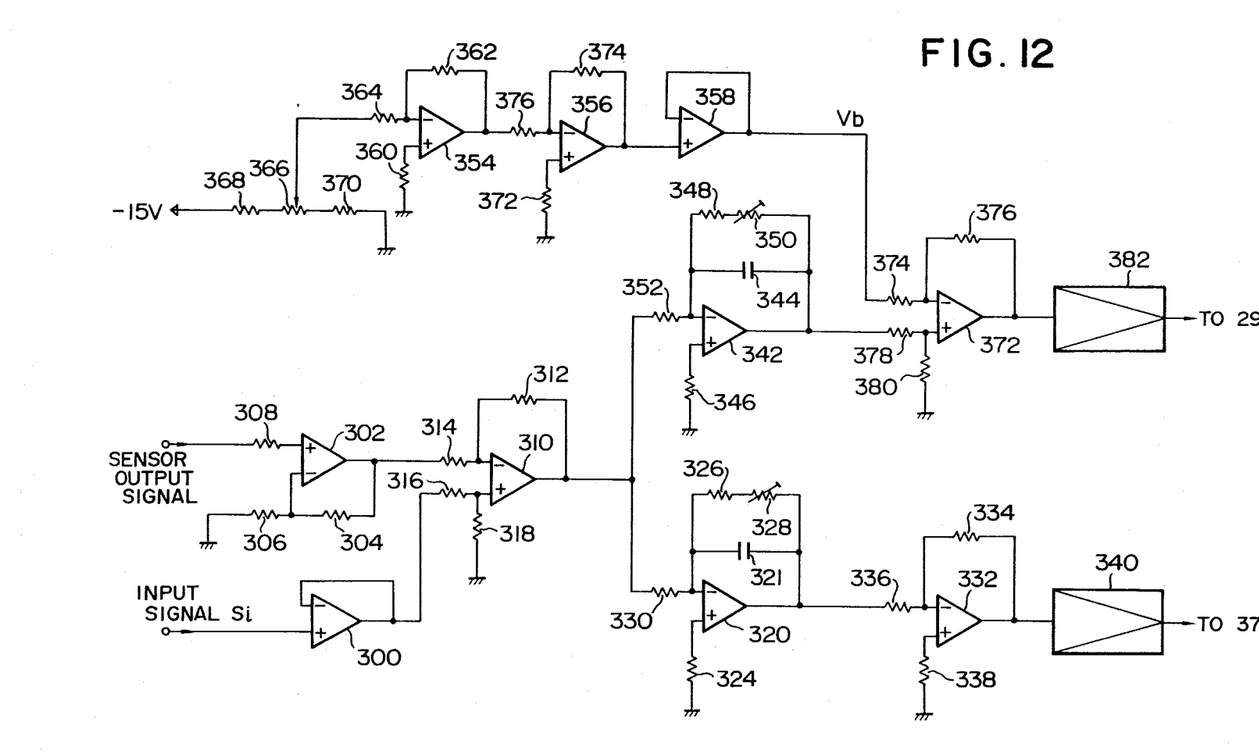
FIG. 12 is a circuit diagram showing another concrete example of the structures of the electric circuit 50, the amplifier 52, the comparison unit 53 and the converting unit of FIG. 9.

FIG. 12 shows another example of a concrete arrangement of the electric circuit 50, the amplifier 52, the comparison unit 53, and the converting unit 51 of FIG. 9. This example applies to the case when the above mentioned phase delay compensation is to be performed.

In FIG. 12, 300 is an operational amplifier which makes up the amplifier 52 (FIG. 9), and its non-inverting input receives the input signal Si which determines a reference value, while its inverting input is connected directly to its output for negative feedback. 302 is an operational amplifier which makes up the converting unit 51 (FIG. 9) along with a pressure sensor (not shown) which detects the output pressure P. The inverting input of the operational amplifier 302 is connected to its output by way of a resistor 304 for negative feedback, and is also grounded by way of a resistor 306. The output signal of the pressure sensor is applied to the non-inverting input of the operational amplifier 302 by way of a resistor 308.

310 is an operational amplifier which makes up a subtraction circuit which functions as the comparison unit 53. The inverting input of this operational amplifier 310 is connected to its output by way of a resistor 312 and is also connected to the output of the operational amplifier 302 by way of a resistor 314. The non-inverting input of the operational amplifier 310 is connected to the output of the operational amplifier 300 by way of a resistor 316, and is also grounded by way of a resistor 318. From the operational amplifier 310 is produced a difference signal between the output signals of the operational amplifiers 300 and 302, respectively, or in other words a control deviation signal.

320 is an operational amplifier which, along with a capacitor 321 for integration and others, makes up a first-order lag element serving as the compensation circuit 55 on the side of the pressure relief valve 40. The non-inverting input of this operational amplifier 320 is grounded by way of a resistor 324 and its inverting input and output are mutually connected by way of a capacitor 321 and a series connection of a resistor 326 and a variable resistor 328. The control deviation signal produced from the operational amplifier 310 is supplied to the inverting input of the operational amplifier 320 by way of a resistor 330. T2 of the transfer function $H2=1/(1+T2s)$ of this compensation circuit may be adjusted by the variable resistor 328.

The operational amplifier 332 makes up an inverting amplifier circuit along with the resistor 334, 336, and 338. The non-inverting input of the operational amplifier 332 is grounded by way of the resistor 338, while its inverting input is connected to its output by way of the resistor 334 and is also connected to the output of the operational amplifier 320 by way of the resistor 336. The output signal of the operational amplifier 320 is both polarity inverted and voltage amplified by this inverting amplifier circuit, and then power-amplified by a differential power amplifier 340 and is supplied to the coil 37 of the pressure relief valve 40 for driving it.

342 is an operational amplifier which along with a capacitor 344 for integration and others makes up a first-order lag element serving as the compensation circuit 54 on the side of the pressure source valve 32.

The non-inverting input of this operational amplifier 342 is grounded by way of a resistor 346 and its inverting input and output are connected together by way of a capacitor 344 and a series connection of a resistor 348 and a variable resistor 350. The control deviation signal produced from the operational amplifier 310 is applied to the inverting input of the operational amplifier 342 by way of a resistor 352. T1 of the transfer function $H1 = 1/(1 + T1s)$ of this compensation circuit may be adjusted by the variable resistor 350.

354, 356, and 358 are operational amplifiers for obtaining the bias voltage Vb. The non-inverting input of the operational amplifier 354 is grounded by a resistor 360, and its inverting input is connected to its output by way of a resistor 362 for negative feedback. The inverting input of the operational amplifier 354 is connected to a slider tap of a potentiometer 366 by way of a resistor 364. One of the terminals of the potentiometer 366 is connected to a −15 V line by way of a resistor 368 and the other of the terminals of the potentiometer 366 is grounded by way of a resistor 370. The non-inverting input of the operational amplifier 356 is grounded by way of a resistor 372 and its inverting input is connected to its output and the output of the operational amplifier 354 by way of resistors 374 and 376, respectively. The inverting input of the operational amplifier 358 is connected to its output, and its non-inverting input is connected to the output of the operational amplifier 356. The bias voltage Vb is obtained on the output of the operational amplifier 358 and its value may be adjusted by moving the slider tap of the potentiometer 366.

The operational amplifier 372 makes up a subtraction circuit along with resistors 374, 376, 378, and 380. The inverting input of the operational amplifier 372 is connected to its output by way of a resistor 376 for negative feedback and is also connected to the output of the operational amplifier 358 by way of the resistor 374. The non-inverting input of the operational amplifier 372 is connected to the output of the operational amplifier 342 by way of the resistor 378 and is grounded via the resistor 380. On the output of the operational amplifier 372 is produced a difference signal between the output signal of the operational amplifier 342 and the bias voltage Vb. This difference signal is power-amplified by the differential power amplifer 382 and then supplied to the coil 29 of the pressure source valve 32 for driving it.

Figure 13:
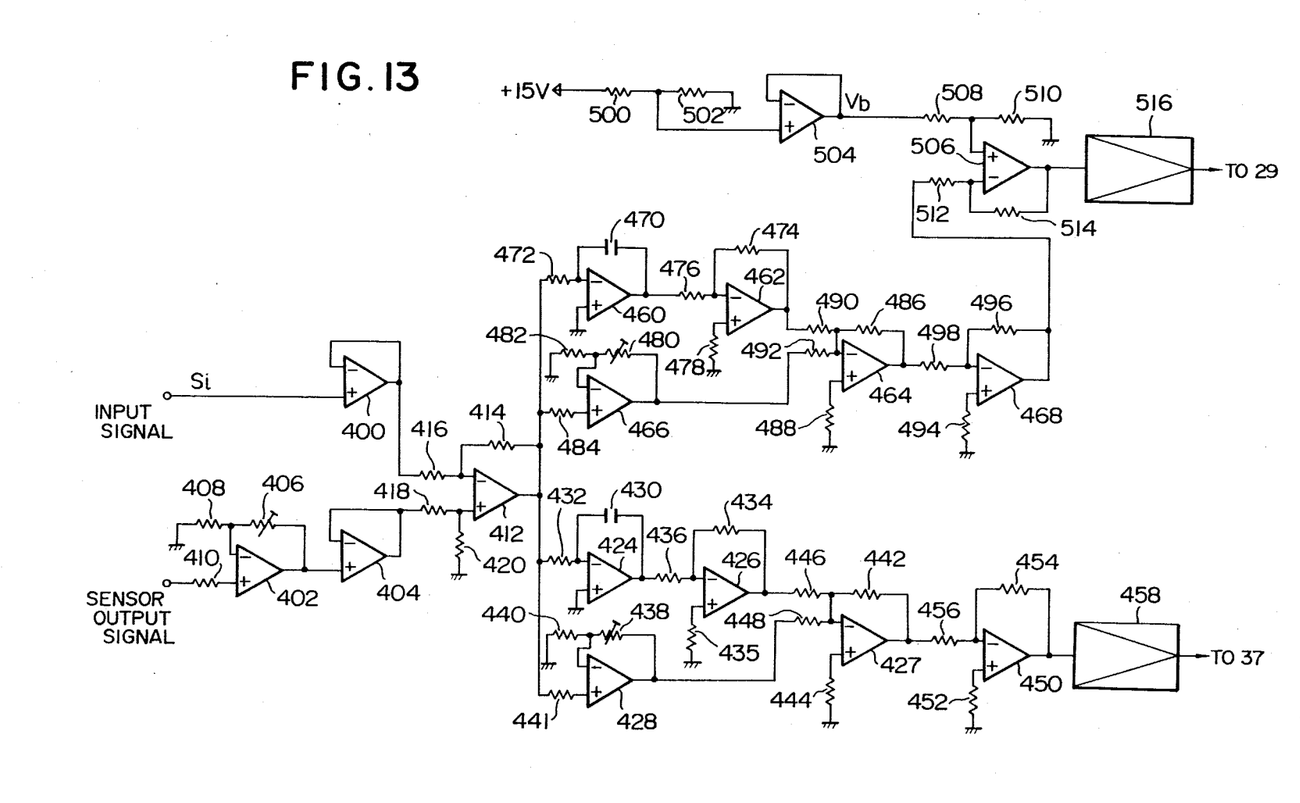
FIG. 13 is a circuit diagram showing yet another concrete example of the structures of the electric circuit 50, the amplifier 52, the comparison unit 53 and the converting unit of FIG. 9.

FIG. 13 shows another example of a concrete arrangement of the electric circuit 50, the amplifier 52, the comparison unit 53, and the converting unit 51 of FIG. 9. This example applies to the case when the above mentioned differentiation—integration compensation is to be performed.

In FIG. 13, 400 is an operational amplifier for the amplifier 52 (FIG. 9), and its non-inverting input receives an input signal Si which determines a reference value while its inverting input is directly connected to its output for negative feedback. 402 and 404 are operational amplifiers which make up the converting unit 51 (FIG. 9) along with a pressure sensor (not shown) which detects the output pressure P. The inverting input of the operational amplifier 402 is connected to its output by way of a variable resistor 406 for negative feedback, and is grounded via a resistor 408. The output signal of the pressure sensor is supplied to the non-inverting input of the operational amplifier 402 by way of a resistor 410. The inverting input of the operational amplifier 404 is directly connected to its output, while its non-inverting input is directly connected to the output of the operational amplifier 402.

412 is an operational amplifier which makes up a subtraction circuit which functions as the comparison unit 53. The inverting input of this operational amplifier 412 is connected to its output by way of a resistor 414 and is also connected to the output of the operational amplifier 400 by way of a resistor 416. A non-inverting input of the operational amplifier 412 is connected to the output of the operational amplifier 404 by way of a resistor 418, and is grounded via a resistor 420. From the operational amplifier 412 is produced a difference signal between the output signals of the operational amplifiers 400 and 404 or in other words a control deviation signal.

424, 426, 427, 428, and 450 are operational amplifiers which make up the compensation circuit 55 on the side of the pressure relief valve 40. The operational amplifier 424 makes up an integration circuit, and its inverting input is connected to its output by way of a capacitor 430 for integration and is also connected to the output of the operational amplifier 412 by way of a resistor 432 while its non-inverting input is directly grounded. The inverting input of the operational amplifier 426 is connected to its output and the output of the operational amplifier 424 by way of resistors 434 and 436, respectively, while the non-inverting input is grounded via a resistor 435. The inverting input of the operational amplifier 428 is connected to its output by way of a variable resistor 438, and is grounded via a resistor 440 while its non-inverting input is connected to the output of the operational amplifier 412 by way of a resistor 441. The operational amplifier 427 makes up an addition circuit for adding up the output signals of the operational amplifiers 426 and 428, and its inverting input is connected to its output by way of a resistor 442 while its non-inverting input is grounded via a resistor 444. The output signals of the operational amplifiers 426 and 428 are applied to the inverting input of the operational amplifier 427 by way of resistors 446 and 448, respectively.

The transfer function $H2 = (1 + A2s)/T2s$ of the compensation circuit 55 may be transformed into $H2 = 1/T2s + A2/T2s$. The first term of this equation is accomplished by the circuit of the operational amplifiers 424 and 426 and the second term is accomplished by the circuit of the operational amplifier 428, while the addition of the first and the second terms is accomplished by the circuit of the operational amplifier 427.

The operational amplifier 450 makes up an inverting amplifier circuit, and its non-inverting input is grounded by a resistor 452 while its inverting input is connected to its output and the output of the operational amplifier 427 by way of resistors 454 and 456, respectively. The output signal of the operational amplifier 450 is power-amplified by a differential power amplifier 458 and then supplied to the coils 37 of the pressure relief valve 40 for driving it.

460, 462, 464, 466, and 468 are operational amplifiers which make up the compensation circuit 54 on the side of the pressure source valve 32. The operational amplifier 460 makes up an integration circuit, and its inverting input is connected to its output by way of a capacitor 470 for integration, and is also connected to the output of the operational amplifier 412 by way of a resistor 472, while its non-inverting input is directly grounded. The inverting input of the operational amplifier 462 is connected to its output and the output of the operational amplifier 460, by way of resistors 474 and 476, respectively, while its non-inverting input is grounded via a resistor 478. The inverting input of the operational amplifier 466 is connected to its output by way of a variable resistor 480, and is grounded via a resistor 482, while its non-inverting input is connected to the output of the operational amplifier 412 by way of a resistor 484. The operational amplifier 464 makes up an addition circuit for adding up the output signals of the operational amplifiers 462 and 466, and its inverting input is connected to its output by way of a resistor 486, while its non-inverting input is grounded via a resistor 488. The output signals of the operational amplifiers 462 and 466 are applied to the inverting input of the operational amplifier 464 by way of resistors 490 and 492, respectively.

The transfer function $H1=(1+A1s)/T1s$ of the compensation circuit 54 may be transformed into $H1=1/T1s+A1/T1s$. The first term of this equation is accomplished by the circuit of the operational amplifiers 460 and 462, and the second term is accomplished by the circuit of the operational amplifier 466, while the addition of the first and the second terms is accomplished by the circuit of the operational amplifier 464.

The operational amplifier 468 makes up an inverting amplifier circuit and its non-inverting input is grounded via a resistor 494, while its inverting input is connected to its output and the output of the operational amplifier 464 by way of resistors 496 and 498, respectively.

A series connection of resistors 500 and 502 connected between the +15 V line and the ground and the operational amplifier 504 make up the DC power source 56. The inverting input of the operational amplifier 504 is directly connected to its output, while its non-inverting input is connected to a connection between the resistors 500 and 502. The bias voltage Vb is obtained on the output of the operational amplifier 504.

The operational amplifier 506 makes up a subtraction circuit along with resistors 508, 510, 512, and 514. The inverting input of the operational amplifier 506 is connected to its output by way of the resistor 514 for negative feedback, and is also connected to the output of the operational amplifier 468 by way of the resistor 512. The non-inverting input of the operational amplifier 506 is connected to the output of the operational amplifier 504 by way of the resistor 508, and is grounded via the resistor 510. On the output of the operational amplifier 506 is obtained a difference signal between the output signal of the operational amplifier 468 and the bias voltage Vb. This difference signal is power-amplified by the differential power amplifier 516 and is then supplied to the coil 29 of the pressure source valve 32 for driving it.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:
1. A servo valve, comprising:
a source pressure valve whose inlet end receives a source pressure;
a pressure relief valve which operates independently from said source pressure valve in mechanical sense and whose outlet end is kept at a pressure which is lower than said source pressure;
an output port which is connected both to an outlet end of said source pressure valve and to an inlet end of said pressure relief valve;
an electric circuit means which:
when an input signal has changed to the effect that an output pressure on said output port should be raised, activates said source pressure valve so as to reduce a pressure difference between said inlet and said outlet ends of said source pressure valve, and activates said pressure relief valve so as to increase a pressure difference between said inlet and said outlet ends of said pressure relief valve, and,
when said input signal has changed to the effect that said output pressure on said output port should be lowered, activates said source pressure valve so as to increase said pressure difference between said inlet and said outlet ends of said source pressure valve, and activates said pressure relief valve so as to reduce said pressure difference between said inlet and said outlet ends of said pressure relief valve;
said source pressure valve and said pressure relief valves are each provided with a valve seat, a valve element and an electromagnetic means for driving said valve element;
said electromagnetic means of said source pressure valve and said pressure relief valve produce forces which tend to bring said respective valve elements towards said corresponding valve seats, and said electric circuit means reduces the electric current supplied to said electromagnetic means of said source pressure valve and increases the electric current supplied to said electromagnetic means of said pressure relief valve when said input signal has changed to the effect that said output pressure obtained on said output port should be raised, and increases said electric current supplied to said electromagnetic means of said source pressure valve and reduces said electric current supplied to said electromagnetic means of said pressure relief valve when said input signal has changed to the effect that said output pressure obtained on said output port should be lowered;
each of said valve seats and each of said corresponding valve elements consists of a bevelled opening and a globular member, respectively, and each of said electromagnetic means comprises a stator core provided around said valve seat, an electromagnetic coil for magnetizing said stator core when electric current is supplied therethrough, and an armature, disposed in movable manner adjacent to said valve seat, which may drive said valve element toward said valve seat by being attached towards said stator core when electric current is supplied to said coil; and
each of said armatures consists of a discal member which is loosely placed opposite to said corresponding valve element.
2. A servo valve, comprising:
a casing having a partition wall defining a first and a second chamber therein;

an inlet port having an input port at its external end and a first valve seat at its internal end opening into said first chamber;

a first valve element which cooperates with said first valve seat;

a first drive means for activating said first valve element;

a communication passage, defined in said partition wall therethrough, which communicates with said first chamber at its one end in said first chamber and defines a second valve seat at its other end in said second chamber;

a second valve element cooperating with said second valve seat;

a second drive means for activating said second valve element; and an output port communicating with said first chamber;

said first and said second valves being formed as one-way valves which, when their valve elements are not activated, allow fluid flow from said input port into said first chamber and then into said second chamber;

each of said drive means comprises a stator core with double walls which are joined together at its one end, an electromagnetic coil disposed between said two walls of said stator core, and an armature placed opposite to said open end of said two walls of said stator core;

each of said valve elements consists of a substantially globular member and each of said valve seats consists of a bevelled opening; and each of said first and said second chambers has a substantially cylindrical shape and each of said coils and each of said armatures are accordingly shaped as a cylindrical body and a discal body, respectively, to be snugly accommodated in said corresponding cylindrical chamber.

* * * * *